Sept. 8, 1964   V. S. MOSINSKIS   3,147,810
RESTRAINING MECHANISM
Filed Sept. 12, 1962   3 Sheets-Sheet 3
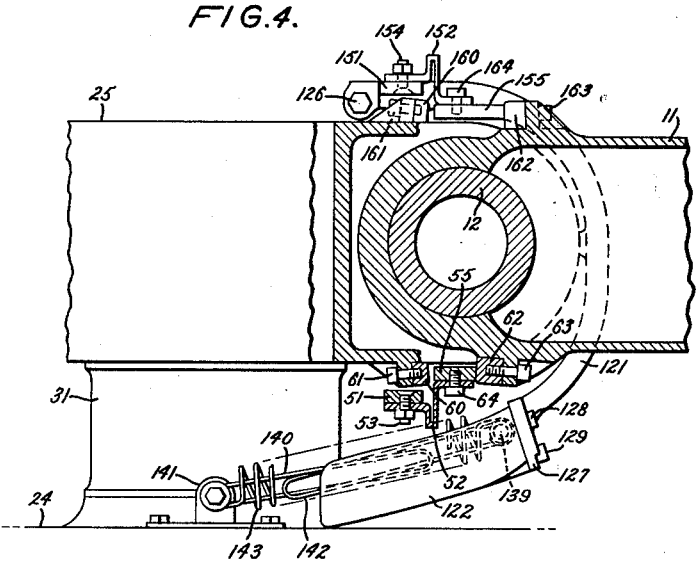
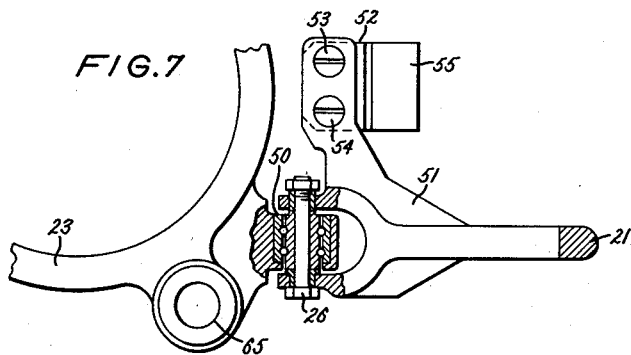
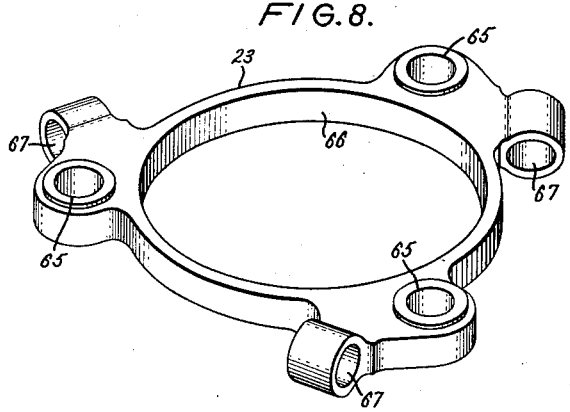
INVENTOR:
Victor S. Mosinskis,
BY
ATTORNEYS.

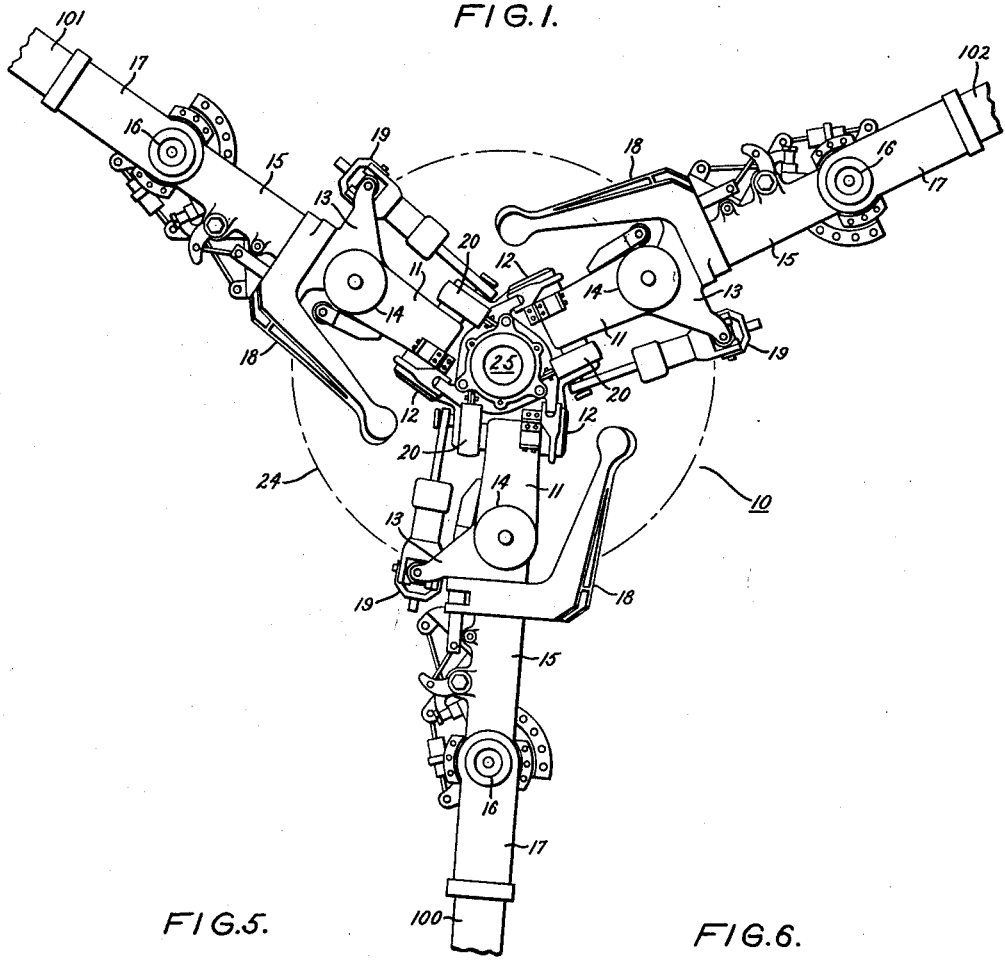

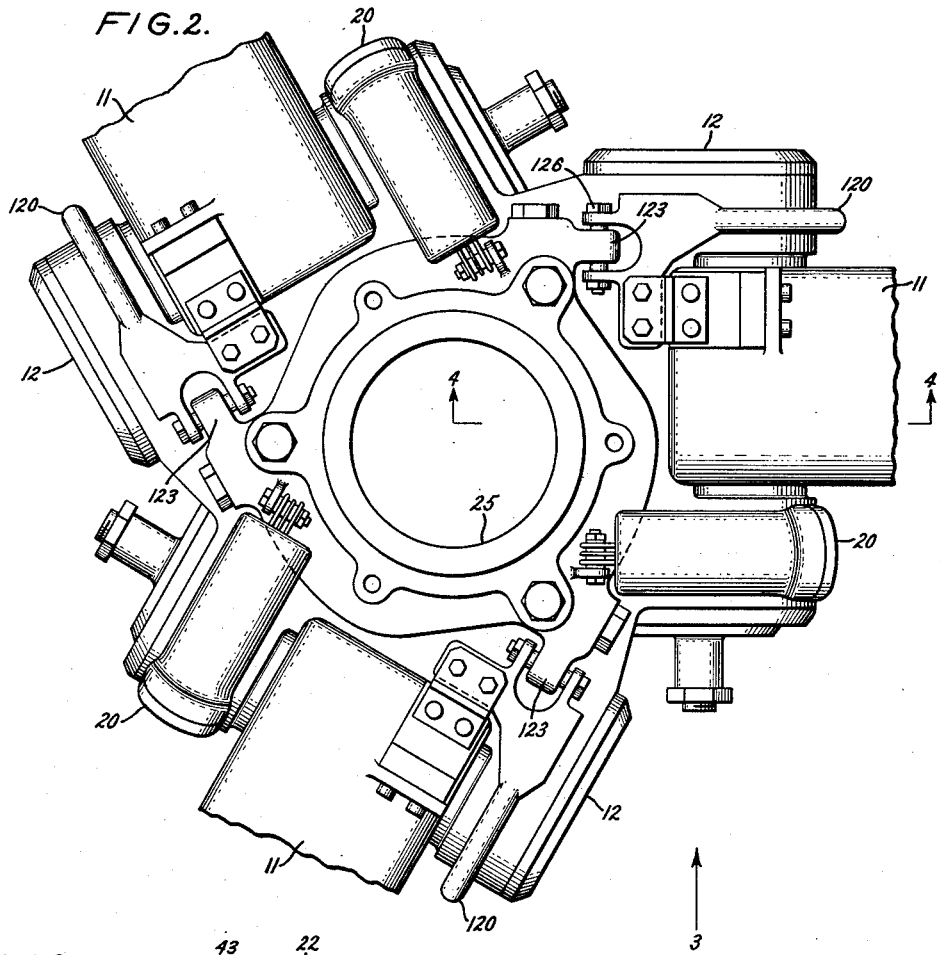
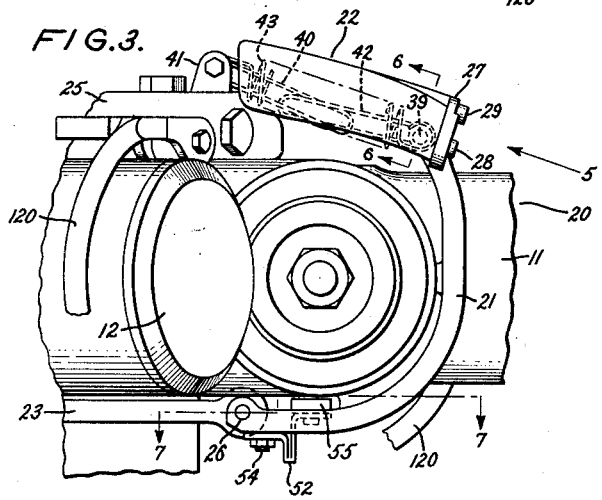

3,147,810
RESTRAINING MECHANISM
Victor S. Mosinskis, Springfield, Pa., assignor to The Boeing Company, Seattle, Wash., a corporation of Delaware
Filed Sept. 12, 1962, Ser. No. 223,162
8 Claims. (Cl. 170—160.55)

This invention relates to a restraining mechanism for restraining motions of elongated members which are connected at one extremity thereof and, more particularly, to a droop restrainer and a flap restrainer for restraining droop and flap motions, respectively, of helicopter rotor blades during stationary or low r.p.m. rotor periods.

Each rotor blade of a rotary wing aircraft is, normally, connected through mechanism, such as a flap hinge, to a rotor hub on the aircraft. These flap hinges, which connect each rotor blade to the hub, have extension links mounted about the rotor hub by hinge pins. During high r.p.m. flight conditions, the flap hinges allow freedom for the rotor blades to flap approximately 30° above a rotor plane, which extends through the axis of rotation of the hinge pins. The flap hinges also permit the rotor blades to lower 3 to 5 degrees below the rotor plane. This allows a total of 33 to 35 degrees of flap hinge action.

While the freedom of a rotor blade to droop and flap is not hazardous during high rotor r.p.m. such freedom is hazardous during either stationary or low rotor r.p.m. periods. That is, high centrifugal forces, which maintain the rotor blades substantially parallel to the rotor plane, exist during high r.p.m. rotor periods but do not exist during stationary or low r.p.m. periods. Therefore, the rotor blades are more susceptible, during stationary or low r.p.m. rotor periods, to gusts of wind or other external forces. Accordingly, during these periods, the rotor blades may collide with the helicopter fuselage, ground platform, ground personnel, and other objects in rotor blade proximity.

It is often desirable to fold helicopter rotor blades when the helicopter is not in use. In this manner, the area needed for parking, stowing, or other handling of helicopters is greatly reduced. However, as a blade folds beyond 90° it tends to "elbow" or rise at its fold hinge to, thereby, raise the extension link to its flap stop. This is very hazardous since it enables the blade to strike the fuselage or hit the ground. Accordingly, unrestrained droop and flap motions, during blade folding operations, are capable of causing damage to personnel and other ground objects in proximity with the rotor blades, the platform on which the helicopter is placed, and the fuselage, the blade, and rotor structure of the helicopter.

This invention eliminates these hazards without inhibiting normal rotor operations. A droop restrainer and a flap restrainer of the invention are employed with each flap hinge. The droop and flap restrainers are similar and each employs a spring mounted weight. During increased rotor r.p.m. the centrifugal forces acting on the weights overbalance the spring forces and extend the springs. This allows the weights to move radially outwardly from the rotor hub. As the rotor r.p.m. is reduced toward zero, the spring forces overbalance the centrifugal forces on the weights and return the weights to their initial positions. The weights are connected through arms to keys. During low and zero rotor r.p.m. the keys, which are positioned by the movement of the weights, are inserted between lugs on the rotor hub and the extension link of the flap hinges. When so inserted, the keys limit movement of the flap hinges about the hinge pins and limit the extent of rotor blade droop and flap. Of course, when rotor r.p.m. is sufficiently great to eliminate blade flap and droop hazards, the weights withdraw the keys associated therewith from between the flap hinge lugs in response to centrifugal forces.

The springs and weights of the droop and flap restrainers of the invention are chosen to cooperate for achieving the purposes of the invention. That is, the springs and weights are chosen so that the flap restrainer weight disengages its associated key at a lower rotor r.p.m. than does the droop restrainer. Thus, as the r.p.m. increases from zero, the flap restrainer disengages first to allow the rotor blade associated therewith a rise away from the droop restrainer when the blade pitch is increased. Thereafter, the droop restrainer is disengaged to provide complete blade freedom for flight operations.

Accordingly, it is an object of the present invention to provide a droop restrainer for limiting rotor blades of rotary wing aircraft from drooping beyond a preselected limit during stationary and low r.p.m. rotor periods.

Another object is the provision of a flap restrainer for limiting rotor blades of a rotary wing aircraft from flapping above a preselected limit during stationary and low r.p.m. rotor periods.

A further object is the provision of droop and flap restrainers for limiting the flapping and dropping of rotor blades of a rotary wing aircraft during stationary and low r.p.m. periods.

Still another object is to provide droop and flap restrainers for restraining rotor blades of rotary wing aircraft during stationary and low r.p.m. rotor periods for eliminating hazards to aircraft structure, ground personnel, the platform on which the aircraft is placed, and other objects in rotor proximity.

Another object is to provide droop and flap restrainers for minimizing droop and flap of rotary aircraft rotor blades, during stationary and low r.p.m. rotor periods in response to spring forces and for removing the flap restrainer and subsequently the droop restrainer in response to centrifugal forces as rotor r.p.m. increases.

An additional object is to provide droop and flap restrainers for restraining, in response to spring forces, helicopter rotor blade droop and flap conditions during stationary and low r.p.m. rotor periods without inhibiting rotor blade freedom during flight periods.

A further object of the invention is the provision of droop and flap restrainers for inserting means into flap hinges of a helicopter rotor, for reducing the rotor blade "in flight" freedom to droop and flap when the rotor blades are stationary or at low r.p.m.

Yet another object is to provide droop and flap restrainers for minimizing droop and flap conditions of rotary wing aircraft rotor blades during stationary and low r.p.m. rotor periods and for removing the restrainers for rotor blade freedom during flight operations.

A still further object is the provision of droop and flap restrainers for minimizing droop and flap conditions of rotary wing aircraft rotor blades when the blades are folded.

Other objects of this invention will be readily perceived from the following description, drawings and claims.

This invention relates to restraining mechanism for limiting relative movement of two members by pivotal motion applied to pivotal means, which is connected to one of the members. Two means are connected to and urge pivotal motion of the pivotal means with one being velocity responsive. The other means urges spacer means mounted on the pivotal means between the two aforesaid members and restrains pivotal motion induced in the pivotal means by the velocity responsive means. In this manner movements of one of the aforesaid two members with respect to the other are restrained until forces from the velocity responsive means cause the pivotal means to pivot and remove the spacer means from between the two members.

This invention further relates to a restrainer of a rotary wing aircraft rotor, which also includes means for pivotally mounting a first member and a second member for movement with respect to each other. The restrainer is employed for limiting movements of a rotor blade, which is connected to the second member. The restrainer has pivotal means which is pivotally mounted to the rotor. Means, responsive to rotor rotation, and spacer means are mounted on the pivotal means. Means are also mounted on the pivotal means for urging the spacer means between the first member and the second member to limit relative motion therebetween and for restraining pivotal motion of the pivotal means in response to the rotor rotation responsive means. Thus, movement of the rotor blade is limited until the rotor rotation responsive means causes pivotal movement of the pivotal means. Accordingly, the spacer means is withdrawn from between the first member and the second member.

The attached drawings illustrate a preferred embodiment of the invention, in which:

FIGURE 1 is a top plan view of a helicopter rotor embodying the droop and flap restrainers of the invention;

FIGURE 2 is an enlarged top plan view of a central portion of the rotor illustrated in FIGURE 1;

FIGURE 3 is a partial side elevational view of the rotor of FIGURE 2, taken in the direction of the arrow in FIGURE 2, and illustrating the droop restrainer with the flap restrainer broken away;

FIGURE 4 is a sectional view of the rotor of FIGURE 2 taken along lines 4—4 and illustrating the flap restrainer and a portion of the droop restrainer of the invention;

FIGURE 5 is an elevational view, taken in the direction of the arrow in FIGURE 3, and showing the pivotal arm of the droop restrainer of the invention;

FIGURE 6 is a cross sectional view taken along lines 6—6 of FIGURE 3 and showing a spring and pivot arm assembly of the droop restrainer of the invention;

FIGURE 7 is a top plan view, partly in section, of a flap hinge restraint assembly of the arm of the droop restrainer taken along lines 7—7 of FIGURE 3 and shown as connected to a restrainer assembly; and FIGURE 8 is a perspective view of the restrainer assembly.

Referring to the drawings and particularly FIGURE 1, there is shown a helicopter rotor 10. The rotor 10 has, a plurality of rotor blades 100, 101, and 102 mounted thereon. Each of the rotor blades is similar in nature and is connected to a blade socket 17 which is connected to a pitch bearing housing 15 through a fold pin 16. The pitch bearing housings 15 are connected through lead-lag hinges and flap hinges to rotor hub 25.

The flap hinges are comprised of a portion of the rotor hub 25 connected to a portion of extension links 11 through hinge pins 12. The lead-lag hinges are comprised of the extension links 11 connected through substantially vertical hinge pins 14 to pitch shafts 13, which rotatably mount the pitch bearing housings 15. Pitch arms 18 are connected through a rain shield 24, which is shown in phantom in FIGURE 1, to helicopter controls. In this manner, the position of the pitch bearing housings 15 and the pitch of the rotor blades are controlled. Dampers 19 are employed to inhibit undesirable lead or lag motions of the rotor blades.

It should be understood that flap hinges may take various forms other than as specifically described herein. That is, a flap hinge may be considered that mechanism which allows a rotor blade connected to a rotor hub to move freely in a substantially vertical direction during flight.

The rotor 10 is shown as mounted on the rain shield 24 and through a spacer 31 (see particularly FIGURE 4). However, it should be understood that the rotor 10 is mounted on a rotatable substantially vertical shaft (not shown) and enclosed within the spacer 31 and the rain shield 24. Further, while the rain shield 24 forms a continuation of the aircraft fuselage, it is connected to and rotates with the rotor assembly.

During flight r.p.m., the flap hinges allow rotor blade freedom of approximately 30 degrees above a rotor plane, which extends through the axis of rotation of the rotor flap hinge pins 12. The flap hinges also permit approximately 3 to 5 degrees freedom of blade movement below the rotor plane during flight r.p.m. This rotor blade freedom of motion about the flap hinge is necessary during high rotor r.p.m. conditions but is hazardous during periods of stationary or low rotor r.p.m. That is, when the rotor is at a high r.p.m. centrifugal forces on the rotor blades maintain them substantially parallel to the rotor plane and within the desired spatial position with respect to the fuselage of the aircraft and other ground objects. However, at low rotor r.p.m. the blades are susceptible to movement as a result of winds or gusts of wind to become hazardous to the aircraft fuselage as well as surrounding ground objects. Thus, it is important. During stationary and low r.p.m. rotor periods, that droop and flap restrainers be employed to reduce the amount of vertical rotor blade freedom.

FIGURE 1 and the disclosure herein sets forth the droop and flap restrainers of the invention as employed in a three-bladed helicopter rotor. However, it should be understood that neither the number of rotor blades of a particular rotor nor the number of rotors of a particular helicopter is of importance but may be varied as desired.

FIGURE 2 illustrates an enlarged view of the rotor hub 25. The rotor hub 25 has droop restrainers 20 and flap restrainers 120 mounted about the flap hinge pin 12. As may be seen in FIGURE 3, the droop restrainer 20 employs an arm 21 pivotally mounted at one extremity by a pin 26 to a retainer 23. The retainer 23 pivotally connects one extremity of the droop restrainer arm 21 to the rotor hub 25. Screws 28, 29, and 30 mount a weight 22 to a flat head portion 27 of the arm 21 (see FIGURE 5). During rotation of the rotor 10, the weight 22 exerts centrifugal forces on the arm 21 to urge the arm 21 to pivot with the pin 26. The droop restrainer head portion 27 is integral with the arm 21 and at an opposite extremity thereof from the pin 26. The arm 21 is spring mounted to a rotor hub mount 41 by a spring 43, which is connected to the rotor hub mount 41 for restraining pivotal motion induced in the arm 21 by centrifugal forces.

As shown in FIGURE 6, the spring 43 is mounted on a pin 39 which is fixedly inserted into bores 33, which extend through ears 37 and 38 of the arm 21. The weight 22 has internally threaded bores 34, 35, and 36 for receiving, respectively, the screws 28, 29, and 30 and for mounting of the weight 22 on the head portion 27. In this manner the weight 22 is mounted over the ends of the pin 39 and assures that the pin 39 will not disengage from the arm 21 by axial movement. The spring 43 is rotationally mounted through bearing 47 to the pin 39. Limiters 40 and 42 are engageably mounted with respect to each other and are connected, respectively, to the rotor hub mount 41 and the pin 39 (see FIGURE 3). The limiters 40 and 42 limit the amount of expansion, to which centrifugal forces may subject the spring 43, by engaging each other at their free extremities. Of course, suitable means such as washers 45 may be employed on the pin 39 between the limiter 42 and the ears 37 and 38 of the arm 21. If desired, washers may also be employed between the limiter 42 and the bearing 47.

The droop restrainer 20 restricts flap hinge movements by the insertion of a spacer or key 55 between striker blocks 60 and 62 of the extension link 11 and the rotor hub 25, respectively. The striker blocks 60 and 62 are, respectively, secured to the rotor hub 25 and the extension link 11 by fastener means such as screws 61 and 63. Thus, when the key 55 is inserted into the flap hinge and between the blocks 60 and 62, pivotal movement of the flap hinge below the rotor plane is limited.

As clearly shown in FIGURES 3, 4, and 7, the droop restrainer arm 21 has an integral mount 51 extending transversely therefrom. A spring 52 is secured to the mount 51 by fastener means such as bolts 53 and 54. The key 55 is resiliently mounted to the mount 51 through the spring 52 by fastener means such as screw 64.

When centrifugal forces exceed the force of the spring 43, the arm 21 and its associated mount 51 pivot with the pin 26, which extends through a ball bearing assembly 50 in a retainer 23 (see FIGURE 7). Thus, the key 55 connected to the spring 52 is either inserted between the blocks 60 and 62 or withdrawn therefrom. Accordingly, when the rotor blade is prone to droop, because of low r.p.m., the key 55 is inserted into the flap hinge between the striker blocks 60 and 62 in response to the force of the spring 43 to limit the flap hinge movement about the hinge pin 12. However, as the r.p.m. of the rotor 10 increases, centrifugal forces acting from the weight 22 overbalance the spring force and withdraw the key 55 by pivoting the arm 21.

Basically, the droop restrainer 20 and the flap restrainer 120 are similar. However, while the droop restrainer inserts the key 55 in the lower side of the flap hinge to reduce the amount of blade droop below the rotor plane, the flap restrainer 120 inserts a spacer or key 155 in the upper side of the flap hinge to reduce the amount of movement available to the flap hinge above the rotor plane. Additionally, while the droop restrainer 20 is both pivotally and resiliently mounted to the rotor hub 25, the flap restrainer 120 has only its pivotal extremity mounted thereon. The other extremity of the flap restrainer 120 is resiliently connected to the rainshield 24 (see FIGURE 4).

As clearly illustrated in FIGURE 4, the flap restrainer 120 employs the same basic components as the droop restrainer 20. That is, the flap restrainer 120 has an arm 121 pivotally connected by a pin 126 to a rotor mount 123 at one extremity thereof (see FIGURE 2) and a flat head portion 127 at a second extremity thereof (see FIGURE 4). A weight 122, which conforms in configuration with the weight 22, is fastened to the flat head portion 127 by fasteners such as screws 128, 129, and a third screw (not shown). A spring 143 resiliently connects the flap restrainer arm 121 to a mount 141 on the rainshield 24. The spring 143 is connected between the mount 141 and a pin 139, which is located in bores in the arm 121 similar to the bores 33 in the ears 37 and 38 of the arm 21 (see FIGURE 6). The pin 139 has assembled thereon the spring 143, a limiter 142, and a bearing and washers similar to those assembled on the pin 39 as illustrated in FIGURE 6. A limiter 140 and the limiter 142 are engageably mounted with respect to each other to limit the expansion of the spring 143 when the flap restrainer arm 121 pivots with the pin 126 in response to centrifugal forces.

As is seen in FIGURE 4, a mount 151 is integral with the arm 121 and extends transversely thereto. The mount 151 has supported thereon a spring 152, which mounts the key 155 to the flap restrainer arm 121. The spring 152 is secured to the mount 151 by fastener means such as bolt 154 and the key 155 is attached to the spring 152 by fastener means such as screw 164. Thereby, when the flap restrainer arm 121 pivots in response to the force of the spring 143 or in response to centrifugal forces, the key 155 is rotated into or out of the flap hinge. Striker blocks 160 and 162 are mounted, respectively, on the rotor hub 25 and the extension link 11 by fastener means such as screws 161 and 163. The blocks 160 and 162 cooperate with the key 155 to limit blade movement above the rotor plane in the same manner as the blocks 60 and 62 cooperate with the key 55. The arm 121, the spring 152, and the key 155 are essentially the same as the corresponding elements mounted on arm 21 as illustrated in FIGURE 7.

Further, the connection of the arm 121 to the rotor hub mount 123 (see FIGURE 2) employs a ball bearing assembly similar to the ball bearing assembly 50 of FIGURE 7.

The spring members 52 and 152, which connect the keys 55 and 155 to their respective restrainer arms 21 and 121, find importance in eliminating the transfer of loads to the pivot pins 26 and 126 and the ball bearing assemblies associated therewith. That is, when the keys 55 and 155 are inserted between their respective striker blocks and the flap hinge attempts to pivot, the forces therefrom are exerted directly, through the striker blocks and the keys, to the rotor hub 25. As the force is exerted on the keys, the resilient springs 52 and 152 flex to avoid exertion of the force upon the pivot points of the restrainer arms 21 and 121. If the members 52 and 152 were inflexible, the forces exerted by the striker blocks 62 and 162 would, at least partially, be exerted on the pivot pins 26 and 126 of the respective restrainers 20 and 120.

As may be seen in FIGURE 8, the retainer 23 employs a plurality of bores 65 and a central bore 66 for, respectively, connecting the retainer 23 to the rotor hub 25 and about the spacer 31. Bores 67 in the retainer 23 house the ball bearing assemblies 50 and the pins 26 to pivotally support the droop restrainers 20, which are employed with each flap hinge.

In operation, the droop and flap restrainers 20 and 120 are spring biased to insert keys 55 and 155 into the flap hinge during stationary and low rotor r.p.m. periods. However, when the rotor 10 rotates to accomplish flight operations, the centrifugal forces acting upon the weights 22 and 122 overbalance the forces of the springs 43 and 143. This causes the droop and flap restrainer arms 21 and 121 to pivot with their respective pivot pins 26 and 126 and to withdraw the keys 55 and 155 from between the striker blocks on the rotor hub 25 and the extension link 11. Withdrawal of the keys 55 and 155 allows the rotor blades freedom of motion during flight operations.

Since the limiters 40, 42 and 140, 142 are engageably mounted with respect to each other, they limit the amount of expansion of the respective springs 43 and 143. As the rotor r.p.m. increases the weights 22 and 122 tend to travel radially outwardly from the rotor hub 25. Of course, the limiters 40, 42 and 140, 142 allow sufficient travel of the weights 22 and 122 and the respective restrainer arms 21 and 121 to completely withdraw the keys 55 and 155 from between the striker blocks 60, 62 and 160, 162.

When rotation of the rotor is slowed to a low r.p.m. the centrifugal forces acting upon the weights 22 and 122 decrease and are overbalanced by the forces of the springs 43 and 143. As the springs 43 and 143 overbalance the centrifugal forces on the weights, the restrainer arms 21 and 121 are again pivoted with their pivot pins 26 and 126 to insert their respective keys 55 and 155 into the flap hinge. Accordingly, movement of the flap hinges about the hinge pin 12 is limited and the hazards of flapping and drooping during stationary and low r.p.m. rotor periods are eliminated.

It should, of course, be understood that the weights 22 and 122 and the springs 43 and 143 are chosen so as to cause the restrainers to disengage at preselected rotor r.p.m. Further, they are chosen in such a manner as to cause the flap restrainer to disengage at a lower rotor r.p.m. than the droop restrainer. Since the flap restrainer is disengaged first, the blades mounted on the rotor 10 are allowed freedom to rise away from the droop restrainer when the blade pitch is increased. Subsequently, at a slightly higher rotor r.p.m. the droop striker block 62 lifts off the key 55; the droop restrainer, because of centrifugal forces on the weight 22, completely withdraws the key 55 to allow complete blade freedom of flight.

Accordingly, the operating ranges of the droop and flap restrainers of the invention are such that at stationary or low r.p.m. rotor periods the rotor blades are restrained from flapping or drooping. However, at a preselected increased r.p.m. the flap restrainers are disengaged. This disengagement of the flap restrainer is predetermined to occur before the rotor r.p.m. is sufficiently high to cause high bending moments to be developed in the blades due to aerodynamic forces. At a still higher preselected rotor r.p.m. the droop restrainers are disengaged and the rotary wing aircraft is free for flight operations.

At the r.p.m. at which the flap restrainers disengage there is a tendency for the rotor blades to rise in response to aerodynamic forces and therefore bind the flap restrainer keys. Such binding of the keys between the striker blocks on the rotor hub and extension link restricts disengagement of the flap restrainers at the proper r.p.m. Accordingly, it is desirable that the insertion of the keys 55 and 155 between, respectively, the lugs 60, 62 and 160, 162 does not completely restrict all droop and flap motions. That is, with an allowance, for example, of one-half degree the removal of the flap restrainer key 155 is facilitated. In this manner, cyclic controls will cause the rotor blades to achieve slight droop and flap motions in the one-half degree of freedom. During the flap motions, the keys 155 are restricted from removal. However, during the droop motions the keys 155 are free from binding and may, therefore, be removed if rotor r.p.m. is sufficient.

It is considered clear from the foregoing that this invention eliminates hazards to the fuselage of a rotary wing aircraft as well as to ground objects such as personnel, and the platform upon which the rotary wing aircraft is placed. Of course, damage to the rotor blades and to the rotor assembly is also avoided by the insertion of droop and flap restrainers to restrict droop and flap motions of rotor blades during stationary or low rotor r.p.m. perids, and during periods of rotor blade folding.

For purposes of exemplification, a particular embodiment of the invention has been shown and described according to the present understanding thereof. However, it will be apparent that changes and modifications in the arrangement and construction of the parts thereof may be resorted to without departing from the spirit and scope of the invention.

I claim:

1. In a rotary wing aircraft, a rotor including means for pivotally mounting a first member and a second member for movement with respect to each other and a restrainer for limiting movements of a rotor blade connected to said second member, said restrainer comprising pivotal means, said pivotal means being connected at a first extremity to said rotor, velocity responsive means connected to a second extremity of said pivotal means, spacer means mounted on said pivotal means, and resilient means connected to said second extremity of said pivotal means for urging said spacer means between said first member and said second member and for restraining pivotal motion of said pivotal means in response to said velocity responsive means.

2. In a rotary wing aircraft, a rotor including means for pivotally mounting a first member and a second member for movement with respect to each other and a flap restrainer for limiting movements of a rotor blade connected to said second member, said flap restrainer comprising pivotal means pivotally mounted on said rotor, spacer means mounted on said pivotal means adjacent the pivotal mounting, means at a distance from the pivotal mounting responsive to rotor rotation and being connected to said pivotal means for transferring centrifugal forces thereto in response to rotor rotation, and means connected to said pivotal means for urging said spacer means between said first member and said second member to limit upward movement of said rotor blade and for restraining pivotal motion of said pivotal means in response to said rotor rotation responsive means whereby upward movement of said rotor blade is limited until said rotor rotation responsive means responds to rotational movement of said rotor to pivot said pivotal means and withdraw said spacer means from between said first member and said second member.

3. In a rotary wing aircraft, a rotor including a plurality of flap hinges having a plurality of first members, and a plurality of second members with each pivotally connected to one of said first members; a plurality of rotor blades connected to said second members; and a droop restrainer and a flap restrainer associated with at least one of said flap hinges; said droop restrainer comprising pivotal means pivotally mounted on said rotor, means responsive to rotor rotation and connected to said pivotal means at a point distant from said pivotal mounting, spacer means mounted on said pivotal means adjacent said pivotal mounting, and means connected to said pivotal means for urging said spacer means between said first member and said second member at a lower surface thereof and for restraining pivotal motion of said pivotal means whereby downward rotor blade movements are limited until said means responsive to rotor rotation pivots said pivotal means to withdraw said spacer means from between said first member and said second member; said flap restrainer comprising pivotal means pivotally mounted on said rotors, means responsive to rotor rotation and connected to said pivotal means at a point distant from said pivotal mounting, spacer means mounted on said pivotal means adjacent said pivotal mounting and means connected to said pivotal means for urging said spacer means between said first member and said second member at an upper surface thereof and for restraining pivotal motion of said pivotal means whereby upward rotor blade movements of said flap hinge are limited until said means responsive to rotor rotation pivots said pivotal means to withdraw said spacer means from between said first member and said second member; said flap restrainer being responsive to a lower preselected rotor rotation for flap restrainer disengagement than a preselected rotor rotation to which said droop restrainer responds for disengagement.

4. In a rotary wing aircraft, a rotor including a rotor hub, a plurality of rotor blades connected to said rotor hub, extension link means connected between said rotor hub and said rotor blades, and pivotal means connecting said rotor hub to said extension link means to permit vertical motion of said rotor blades, droop and flap restrainer means associated with at least one of said flap hinges; said droop restrainer means comprising a pivotal arm, a rotor mount for pivotally connecting said arm to said rotor, rotor rotation responsive means connected to said arm at a point distant from said pivotal connection, a spacer located adjacent said pivotal connection, mounting means connected to said arm for mounting said spacer on said arm, and means connected to said arm for urging said spacer into a position under said pivotal means and between said rotor hub and said extension link means and for restraining pivotal motion of said arm whereby downward rotor blade movements are limited until said rotor rotates sufficiently to pivot said arm in response to movement of said rotor rotation responsive means to withdraw said spacer during rotor flight r.p.m.; said flap restrainer means comprising an arm, a rotor mount connecting said arm to said rotor, rotor rotation responsive means connected to said arm at a point distant from the rotor mount, a spacer located adjacent the rotor mount, mounting means connected to said arm for mounting said spacer on said arm, and means connected to said arm for urging said spacer into a position above said pivotal means and between said rotor hub and said extension link means and for restraining pivotal motion of said arm whereby upward rotor blade movements are limited until said rotor blade rotates sufficiently to pivot said arm in response to movement of said rotor rotation responsive means to thereby withdraw said spacer during rotor flight r.p.m.; said flap restrainer means being responsive at a lower preselected rotor rotation for disengagement than a preselected rotor rotation to which said droop restrainer means responds for disengagement.

5. In a rotary wing aircraft, droop restrainer means and flap restrainer means as claimed in claim 4 wherein said droop restrainer mounting means comprises a mounting arm integral with said pivotal arm of said droop restrainer means, and a bias means mounted on said mounting arm for mounting said spacer of said droop restrainer means whereby transfer of droop rotor blade forces to the pivotal arm of said droop restrainer means is avoided; and wherein said flap restrainer mounting means comprises a mounting arm integral with said pivotal arm of said flap restrainer means and a bias means mounted on said mounting arm for mounting said spacer of said flap restrainer means whereby transfer of flap rotor blade forces to the pivotal arm of said flap restrainer means is avoided.

6. In a rotary wing aircraft, droop restrainer means and flap restrainer means as claimed in claim 5 wherein said means connected to said pivotal droop restrainer arm for urging said spacer mounted thereon into a position under said pivotal means and between said rotor hub and said extension link means and for restraining pivotal rotation of said pivotal droop restrainer arm comprises resilient means connected between a mount on said rotor and said pivotal arm, a first limiter connected to the mount, and a second limiter mounted on said pivotal arm, said first limiter and said second limiter being engageably mounted with respect to each other for limiting expansion of said resilient means in response to centrifugal forces acting on said pivotal arm whereby said resilient means provides a force overriding centrifugal forces at low rotor r.p.m. and inserts said droop restrainer spacer between said extension link and said rotor hub; and wherein said means connected to said pivotal flap restrainer arm for urging said spacer mounted thereon into a position over said pivotal means and between said rotor hub and said extension link means and for restraining pivotal rotation of said pivotal flap restrainer arm comprises resilient means connected between a mount on said rotor and said pivotal arm, a first limiter connected to the mount and a second limiter mounted on said pivotal arm, said first limiter and said second limiter being engageably mounted with respect to each other for limiting expansion of said resilient means in response to centrifugal forces acting on said pivotal arm whereby said resilient means provides a force overriding centrifugal forces at low rotor r.p.m. and inserts said flap restrainer spacer between said extension link and said rotor hub.

7. In a rotary wing aircraft, droop restrainer means and flap restrainer means as claimed in claim 6 wherein the mass of said rotor rotation responsive means of said flap restrainer means and the resiliency of said flap restrainer resilient means connected between said flap restrainer pivotal arm and said mount associated therewith are chosen to cause said flap restrainer means to react to lower centrifugal forces than said droop restrainer means whereby as the rotor rotation increases from low rotor r.p.m. to flight r.p.m. the flap restrainer means disengages first and subsequently said droop restrainer means disengages.

8. In an aircraft a first rotating member, a second rotating member hinged with respect to said first rotating member to allow relative movement between said first and second member, a restrainer for limiting the relative movement of a first rotating member with respect to a second rotating member comprising pivotal means pivotally connected to one of said rotating members, spacer means resiliently mounted on said pivotal means adjacent said pivotal connection and adjacent said hinge means, first means connected to said pivotal means for urging said pivotal means to pivot in a first direction in response to the centrifugal force generated by said rotating members and second means connected to said pivotal means for restraining pivotal motion in said first direction and for urging pivotal motion of said pivotal means in a second direction, said first and second means connected to said pivotal means at a point distant from the pivotal connection whereby said pivotal means urges said spacer means between said first member and said second member.

References Cited in the file of this patent
UNITED STATES PATENTS

| | | |
|---|---|---|
| 2,471,681 | Gluhareff | May 31, 1949 |
| 2,549,887 | Buivid | Apr. 24, 1951 |
| 2,614,640 | Buivid | Oct. 21, 1952 |
| 2,616,510 | Rzeczycki | Nov. 4, 1952 |
| 2,719,593 | Alex | Oct. 4, 1955 |